3,069,313
ORGANOPHOSPHORUS COMPOUNDS
Loyal F. Ward, Jr., and Donald D. Phillips, Modesto, Calif., assignors to Shell Oil Company, New York, N.Y., a corporation of Delaware
No Drawing. Filed Feb. 13, 1961, Ser. No. 88,674
20 Claims. (Cl. 167—30)

This invention pertains to a new class of phosphorus-containing compounds which have been found to be particularly useful as agricultural chemicals.

The compounds provided by the invention are neutral esters of acids of pentavalent phosphorus wherein one ester group is a 1-thiovinyl group. The compounds are described more particularly, but in terms of their genus, by the formula:

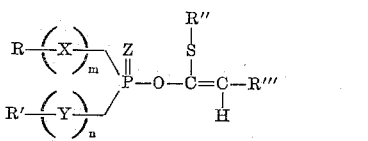

wherein R, R' and R'' is each a lower molecular weight hydrocarbon group or lower molecular weight substituted hydrocarbon group, R''' is hydrogen or a group represented by R, $m$ and $n$ each is 0 or 1, X and Y each is —O—, —S—, —NH— or

(wherein $R^0$ represents a group of the class represented by R), and Z is oxygen or sulfur, with the proviso that when $m$ and $n$ are both 1 and X and Y are each —O— or —S—, R and R' together can represent a divalent group, R and R' each representing one bond of that group. It is to be further understood that when either or both of X and Y are

the groups R and $R^0$, or R' and $R^0$, as the case may be, can together represent a divalent group.

The groups represented by R, R', R'', R''', and $R^0$ can be aliphatic, cycloaliphatic, aromatic, or mixed hydrocarbon groups. When aliphatic, they may be either straight chain or branched chain in configuration; preferably they are saturated. Type-wise, the suitable hydrocarbon groups include alkyl, cycloalkyl, aryl, aralkyl, and the like. Such groups may contain, for example, from one to ten, or even more, carbon atoms each. Illustrative examples include the methyl, ethyl, n- and iso-propyl groups, the various isomeric butyl, pentyl, hexyl, octyl, nonyl, and the like alkyl groups; the cyclopentyl, cyclohexyl and like cycloalkyl groups; the phenyl group; the naphthyl group, the benzyl, phenethyl, p-methylbenzyl and like aralkyl groups; the isomeric xylyl groups, the ethylphenyl groups, the 2,4- and 3,5-dimethylphenyl groups, and like alkaryl groups, and the like.

In those compounds of the foregoing formula wherein $m$ and $n$ both are 1, X and Y are each oxygen or sulfur and R and R' together represent a divalent group, it is preferred that the divalent group be an alkylene group of up to 10 carbon atoms, with from 1 to 5—preferably 2 or 3—carbon atoms in the chain thereof which bonds together the carbon atoms thereof which are bonded to the indicated oxygen or sulfur atoms represented by X and Y.

In those compounds of the foregoing formula wherein at least one of $m$ and $n$ is 1, and at least one of X and Y is

and R and $R^0$, and/or R' and $R^0$) together represent a divalent group, it is preferred that the divalent group be an alkylene group of up to 10 carbon atoms, with from 4 to 5 carbon atoms in the chain thereof. Where the divalent chain contains 5 carbon atoms, it suitably may form with the nitrogen atom a pyridyl group.

The suitable substituted hydrocarbon groups are those of the foregoing hydrocarbon groups which are substituted by one or more non-hydrocarbon substituents. The preferred substituents are halogen, particularly the middle halogens, bromine and chlorine; the nitro group; the cyano group; the amino groups represented by the formula

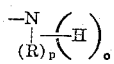

wherein R has the meaning already set out herein, $o$ is 0, 1 or 2, and $o+p=2$; the aliphaticoxy-carbonyl groups, particularly carboalkoxy and carboalkoxyalkylene groups of up to 8 carbon atoms; hydrocarbonoxy groups, R—O— wherein R has the meaning already set out herein; and amido groups having the amino moiety set out above, and including amido groups of the formula

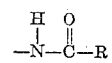

Illustrative examples of the non-hydrocarbon groups include monohaloalkyl groups, such as the chloromethyl and bromomethyl groups, the 2-chloroethyl, 1-bromopropyl, 3-chloropropyl and the like; 1,2-dichloroethyl, 2,2-dibromoethyl, 3,3-dichloro-2-bromopropyl groups and the like; nitroalkyl groups such as the 2-nitroethyl group; halo-substituted aromatic groups such as the various isomeric chloro- and bromophenyl groups, the various isomeric polyhalophenyl groups, such as the 2,6-dichlorophenyl group, the 3,5-dibromophenyl group, and the like; amino-substituted groups, such as the 2-aminoethyl group, the 2-dimethylaminoethyl group and the like; the aniline group; the p-dimethylaminophenyl group, the p-ethyl-aminobenzyl group, and the like.

Of particular interest because of their insecticidal activity are the di(lower alkyl) beta-unsubstituted vinyl phosphates of this class—i.e., those compounds of the general formula wherein $m$ and $n$ both are 1, X, Y and Z each represent oxygen (—O—), and both R and R' are both lower alkyl, for example containing from 1 to 4 carbon atoms and R''' is hydrogen. These particular compounds have the formula:

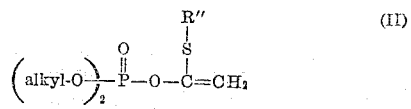

wherein "alkyl" represents an alkyl group of from 1 to 4 carbon atoms, and R'' has the meaning already set out herein. Preferably, R'' represents a mono- or di-nuclear aromatic group bonded directly or through alkylene of from 1 to 4 carbon atoms to the indicated sulfur atom, and including both hydrocarbon and substituted-hydrocarbon groups, the suitable substituents being those preferred substituents already set out herein.

In the compounds of this invention containing halogen, it is preferred that the halogen be a middle halogen—that is, bromine or chlorine.

To further illustrate and demonstrate the character of the compounds of this invention, the following species thereof are submitted:

Dimethyl 1-(phenylthio)vinyl phosphate
O,O-dimethyl O-(1-(phenylthio)vinyl) phosphorothioate
Diethyl 1-(phenylthio)vinyl phosphate
1-benzylthio)vinyl dimethyl phosphate
1-(benzylthio)vinyl di-n-propyl phosphate 1-(phenylthio)vinyl diisopropyl phosphate
1-(p-chlorophenylthio)vinyl dimethyl phosphate
Dimethyl 1-(p-tolylthio)vinyl phosphate
Dimethyl 1-(p-nitrophenylthio)vinyl phosphate
Dimethyl 1-(trichlorophenylthio)vinyl phosphate
Methyl 1-(phenylthio)vinyl dimethylphosphoramidate
Dibutyl 1-(phenylthio)vinyl phosphate
Methyl 1-(phenylthio)vinyl phenylphosphonate
1-(benzylthio)vinyl diisopropyl phosphate
Dimethyl 1-(2-naphthylthio)vinyl phosphate
Dimethyl 1-(methylthio)vinyl phosphate
Methyl ((1-(dimethoxyphosphinyloxy)vinyl)thio)acetate
Phenyl methyl 1-(phenylthio)vinyl phosphate
Benzyl ethyl 1-(p-chlorophenylthio)vinyl phosphate
Dibenzyl 1-(benzylthio)vinyl phosphate
Diphenyl 1-(methylthio)vinyl phosphate
Methyl p-chlorophenyl 1-(phenylthio)vinyl phosphate
Dimethyl 1-(phenylthio)-2-methylvinyl phosphate
Dimethyl 1-(phenylthio)-2-phenylvinyl phosphate
Dimethyl 1-(phenylthio)-2-benzylvinyl phosphate The compounds of this invention are readily prepared by bringing together an alkyl ester of an acid of trivalent phosphorus with an ester of an alpha-halothiolacetic acid, this reaction being described by the equation:

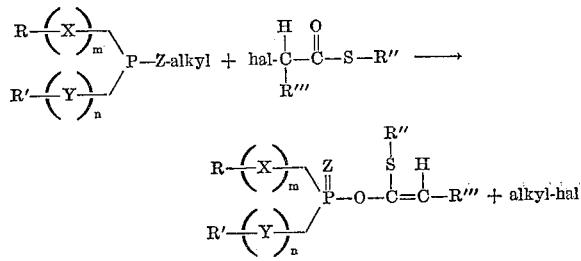

Preferably, "alkyl" represents a lower alkyl group, for example, a n-alkyl group of from 1 to 4 carbon atoms, and "hal" represents a middle halogen atom, that is, bromine or chlorine. The other symbols have the respective meanings already set forth herein.

As is set forth in Kosolapoff, "Organophosphorus Compounds," Wiley, 1950, the above-described esters of acids of trivalent phosphorus—that is, phosphites, phosphonites and phosphinites—are well-known classes of compounds.

The esters of alpha-halothiolacetic acid likewise are known, the method for their preparation being described by Dalgliesh and Mann, Journal of the Chemical Society (London), 1947, pages 559–560. The method involves reaction of a haloacetyl halide with an aqueous solution of an alkali metal salt of the appropriate mercaptan.

The preparation of a typical member of these S-esters of halothiolacetic acid is shown in the following example:

*Example I.—S-Phenyl Chlorothiolacetate*

81 grams of chloroacetyl chloride was added with stirring over a 5-minute period to a mixture of 55 grams of thiophenol, 29.4 grams of sodium hydroxide, 90 milliliters of water and 325 grams of ice. The mixture was stirred for 10 additional minutes, until the ice was melted. The resulting solid was filtered, washed thoroughly with ice water, and air-dried to give 71 grams of crude product melting at 43–44° C. (literature: 45° C.). The product then was charcoaled in ether, and recrystallized by adding a mixture of 2–3 volumes of pentane/volume of ether and chilling. Result: 58 grams melting at 44–45° C. (two crops). Identified as S-phenyl chlorothiolacetate by elemental analysis, infrared spectrum analysis and comparison of physical properties to those reported in the literature.

Other esters of alpha-halothiolacetic acids which have been prepared in this same general manner include: S-benzyl chlorothiolacetate, S-p-chlorophenyl chlorothiolacetate, S-p-tolyl chlorothiolacetate, S-p-nitrophenyl chlorothiolacetate, S-phenyl alpha-chloro-alpha-methyl-thiolacetate, S-trichlorophenyl chlorothiolacetate, S-2-naphthyl chlorothiolacetate, S-methyl chlorothiolacetate, and methyl (chloroacetylthio)acetate.

The reaction between the thiolacetate and the phosphorus ester is effected by slowly mixing a moderate excess of the phosphorus ester with the thiolacetate, and controlling the temperature either by heating or cooling as necessary to maintain the reaction temperature within the range of from about 40° C. to about 150° C. The by-product alkyl halide may be removed from the reaction zone as it is formed by adjusting the pressure in the reaction system so that the alkyl halide volatilizes while the product and the reactants do not. However, in some cases the boiling point of the alkyl halide may be fairly close to the boiling point of the thiolacetate reactant, so that such a technique is undesirable; in such cases, the formed alkyl halide is most conveniently allowed to remain in the reaction zone until the desired reaction is substantially complete, and then is removed together with any unreacted thiolacetate by distillation of the reaction mixture under reduced pressure. Some of the higher molecular weight reactants and reaction products are solids at ordinary room temperatures; in these cases, use of an inert solvent such as xylene insures a fluid reaction system. To insure complete reaction between the phosphorus ester and the thiolacetate, the reaction mixture is heated for a reasonable time—e.g., from about one hour to about ten hours—after addition of all of the phosphorus ester. It will be found generally desirable to employ at least a 10% excess of the phosphorus ester, and excesses up to 50% will be found most effective in many cases in insuring that the reaction is complete within a reasonable time.

The thiovinyl ester product can be recovered by distillation under sufficiently low pressure that thermal decomposition of the product is avoided. With the higher molecular weight products, however, it is often convenient to recover the product by crystallization or by molecular distillation. Where the desired product has a higher boiling point than either of the reactants, the product can be obtained by merely stripping off the lower boiling materials to recover the product as residue. Such a product often is sufficiently pure to be used for agricultural purposes.

Because of the reactivity of the various compounds involved, it is usually necessary to exclude any substantial amount of water from the reaction and work-up zones.

Preparation of typical species of the compounds of this invention is described in the following examples. These examples are intended to be illustrative and exemplary in character only, and are not to be considered as limiting the invention in any way.

*Example II.—Dimethyl 1-(Phenylthio)Vinyl Phosphate*

38 grams of trimethyl phosphite was added to 52 grams of S-phenyl chlorothiolacetate over a period of 15 minutes, the mixture being maintained at 80–85° C. The mixture then was heated to 105° C., the heating requiring 30 minutes, then the mixture was held at 105–110° C. for an additional 90 minutes. An additional 7 grams of trimethyl phosphite was then added and the mixture was heated at 105–110° C. for an additional 30 minutes. During this procedure, 10 grams or 71% of theory, of methyl chloride was evolved. The mixture then was stripped under water aspirator reduced pressure to yield an additional 3.5 grams of methyl chloride. Total methyl chloride evolved: 96.5% of theory. The mixture then was Claisen-distilled to a kettle temperature of 125° C. at 0.02 millimeter mercury pressure. The bottoms product then was molecularly distilled to give 46 grams of product boiling at 105–110° C. at 0.001 millimeter mercury pressure; density: 1.23 grams/cubic centimeter; index of refraction: $n_D^{25}=1.5348$. The product was identified as dimethyl 1-(phenylthio)vinyl phosphate by elemental analysis as follows: Analysis for PSO$_4$C$_{10}$H$_{13}$ (percent by weight): P—11.9; S—12.3.

Analysis of product (percent by weight): P—11.4; S—12.1. The identity of the product was confirmed by infrared spectrum analysis.

By this same general procedure, but by substituting equivalent quantities of triethyl phosphite, triisopropyl phosphite and tri-n-butyl phosphite, respectively, there was prepared diethyl-, diisopropyl- and di-n-butyl 1-phenylthio)vinyl phosphates, respectively.

*Example III.—Dimethyl 1-(Benzylthio)Vinyl Phosphate*

27 grams of trimethyl phosphite was added to 36 grams of S-benzyl chlorothiolacetate over a period of 10 minutes, the mixture being maintained at 75–80° C. The mixture then was heated to 100° C. and maintained for 2 hours at 110–120° C. 66% of the theoretical amount of methyl chloride was evolved. The mixture then was heated for an additional 1.5 hours at 110–120° C. 5 grams of trimethyl phosphite then was added and the mixture heated for an additional 2 hours at 115–120° C. The mixture then was stripped to 120° C. at 0.1 millimeter mercury pressure to give 45 grams of product. This product then was molecularly distilled to give a product boiling at 135–140° C. at 0.001 millimeter mercury pressure; density, 1.22 grams/cubic centimeter; and index of refraction, $n_D^{25}$—1.5295.

Analysis for dimethyl 1-(benzylthio)vinyl phosphate (PSO$_4$C$_{11}$H$_{15}$)(percent by weight): S—11.7; P—11.3. Found (percent by weight): S—11.5; P—11.8. The identity of the product was confirmed by infrared spectrum analysis.

By this same general procedure, substituting equivalent amounts of triethyl phosphite and triisopropyl phosphite, respectively, there was prepared diethyl and diisopropyl 1-(benzylthio)vinyl phosphates, respectively.

*Example IV.—Dimethyl 1-(p-Chlorophenylthio)Vinyl Phosphate*

16.2 grams of trimethyl phosphite was added over a 15-minute period to 24 grams of S-p-chlorophenyl chlorothiolacetate, the mixture being maintained at 75–85° C. The mixture was heated to about 100° C. and maintained at 100–105° C. for 1 hour. About 3 grams of trimethyl phosphite then was added and the mixture heated for an additional hour at 110° C. The mixture then was stripped while cooling, under water aspirator reduced pressure. 100% of the theoretical amount of methyl chloride was evolved. The mixture was stripped of excess trimethyl phosphite at 45–50° C. at 1.5 millimeters mercury pressure. 35 grams of bottoms was obtained; this was molecularly distilled at 100–105° C. at 0.001 millimeter mercury pressure to give 25 grams of dimethyl 1-(p-chlorophenylthio)vinyl phosphate; density, 1.32 grams/cubic centimeter; index of refraction, $n_D^{25}$—1.544.

Analysis.—Calculated (percent by weight): Cl—12.1; P—10.5. Found (percent by weight): Cl—12.3; P—10.6. Infrared spectrum analysis confirmed the identification.

By this same general procedure, diethyl 1-(p-chlorophenylthio)vinyl phosphate was prepared by substituting an equivalent amount of triethyl phosphite.

*Example V.—Dimethyl 1-(p-Tolylthio)Vinyl Phosphate*

Dimethyl 1(p-tolylthio)vinyl phosphate was prepared according to the general procedure set out in Example I, but substituting for the S-phenyl chlorothiolacetate an equivalent amount of S-p-tolyl chlorothiolacetate. The product was identified by elemental analysis and by infrared spectrum analysis.

*Example VI.—Dimethyl 1-(p-Nitrophenylthio)Vinyl Phosphate*

11 grams of trimethyl phosphite was added over a 10-minute period to 17 grams of S-p-nitrophenyl chlorothiolacetate, the mixture being gradually heated from 35° C. to 80° C. during the addition. The mixture then was heated at 95–105° C. for one hour, 2 grams of trimethyl phosphite was added, and the final mixture was heated for 0.5 hour at 100–105° C. This mixture was cooled, whereupon it solidified. The solid was treated with ether, and the solution was decolorized with charcoal. 17 grams of dimethyl 1-(p-nitrophenylthio)vinyl phosphate, melting at 70–71° C. were obtained.

Analysis.—Calculated (percent by weight) P—10.2: S—10.5. Found (percent by weight) P—10.3; S—11.0.

*Example VII.—Dimethyl 1-(Trichlorophenylthio)Vinyl Phosphate*

22.4 grams of trimethyl phosphite was added over a 10-minute period to 43.5 grams of S-trichlorophenyl chlorothiolacetate, originally at 70° C. During the addition of the first 11 grams of the phosphite, the temperature rose to 95° C. The balance was added at 90–95° C., and the mixture was then heated for 1.5 hours at 100–110° C. 100% of the theoretical methyl chloride was evolved. 3 grams of trimethyl phosphite were then added, and the mixture heated at 100–120° C. for a further 30 minutes. The mixture then was stripped in a molecular still at 88–92° C. and 0.001 millimeter mercury pressure to give 49 grams of bottoms; density, 1.46 grams/cubic centimeter; index of refraction, $n_D^{25}$—1.5610; identified as dimethyl 1-(trichlorophenylthio)vinyl phosphate.

Analysis.—Calculated (percent by weight): Cl—29.3; P—8.5; S—8.8. Found (percent by weight): Cl—28.8; P—8.5; S—8.3. The identity of the product was confirmed by infrared spectrum analysis.

By the same general procedure diethyl 1-(trichlorophenylthio)vinyl phosphate was prepared by substituting an equivalent amount of triethyl phosphite.

*Example VIII.—Dimethyl 1-(2-Naphthylthio)Vinyl Phosphate*

The procedure of Example I was repeated, substituting S-2-naphthyl chlorothiolacetate for S-phenyl chlorothiolacetate. A 75% yield of dimethyl 1-(2-naphthylthio)vinyl phosphate, density 1.26 grams/cubic centimeter, index of refraction $n_D^{25}$—1.6000, was obtained.

Analysis.—Calculated (percent by weight): P—10.0; S—10.3. Found (percent by weight): P—9.5; S—10.7.

*Example IX.—Methyl 1-(Phenylthio)Vinyl Dimethylphosphoramidate*

31 grams of dimethyl dimethylphosphoramidite was added over a 10-minute period to 37 grams of S-phenyl chlorothiolacetate, maintained at 80–90° C. The mixture was heated for 1 hour at 90° C., stripped lightly to remove methyl chloride, heated for 0.5 hour at 100° C., stripped lightly, then allowed to stand. The residue was stripped at 75–85° C. at 0.001 millimeter mercury pressure in a molecular still, and the resulting residue was distilled in the molecular still to give 35 grams of methyl 1-(phenylthio)vinyl dimethylphosphoramidate boiling at 120–125° C. at 0.001 millimeter mercury pressure, density 1.17 grams/cubic centimeter.

Analysis.—Calculated (percent by weight): N—5.1; S—11.7. Found (percent by weight): N—5.1; S—12.2.

By the same general procedure, but substituting an equivalent amount of S-benzyl chlorothiolacetate, there was prepared methyl 1-(benzylthio)vinyl dimethylphosphoramidate.

*Example X.—Methyl 1-(Phenylthio)Vinyl Phenylphosphonate*

About 15 grams of dimethyl phenylphosphonite was heated to 55° C. with 34 grams of S-phenyl chlorothiolacetate, the mixture being maintained at 55–60° C., while an additional 19 grams of trimethyl phosphite were added over a period of 20 minutes. The mixture was maintained at 55–60° C. for an additional 90 minutes, then was lightly stripped to remove methyl chloride. After standing overnight, the product was stripped at 20–25° C. and 1.0 millimeter mercury pressure, and the residue was distilled in a molecular still to give 38 grams of methyl 1-(phenylthio)vinyl phenylphosphonate boiling at 135–140° C. at 0.001 millimeter mercury pressure, index of refraction: $n_D^{25}$—1.5797.

*Analysis.*—Calculated (percent by weight): P—10.1; S—10.5. Found (percent by weight): P—9.8; S—11.1.

By this general procedure, ethyl 1-(phenylthio)vinyl phenylphosphonate was prepared by substituting an equivalent amount of diethyl phenylphosphonite.

*Example XI.—Dimethyl 1-(Methylthio)Vinyl Phosphate*

109 grams of trimethyl phosphite was added over one hour to 100 grams of S-methyl chlorothiolacetate at 90–95° C. The mixture was heated a further 2 hours at 100–110° C. and stripped lightly to remove low-boiling materials, then heated for a further 3.5 hours at 100–115° C. The mixture was again stripped lightly, and heated for 3.5 hours more at 110–115° C., and stripped lightly while cooling. Next day the mixture was heated for a further 3.5 hours at 100–115° C., stripped lightly, and allowed to cool. The residue then was Claisen-distilled to give a cut boiling between 40° C. at 0.08 millimeter mercury pressure to 105° C. at 0.02 millimeter mercury pressure. This cut then was fractionally distilled to give 41 grams of dimethyl 1-(methylthio)vinyl phosphate, boiling at 73–75° C. at 0.02 millimeter mercury pressure, index of refraction: $n_D^{25}$—1.4710.

*Analysis.*—Calculated (percent by weight): P—15.7; S—16.2. Found (percent by weight): P—16.0; S—15.5. The identity of the phosphate was confirmed by infrared spectrum analysis.

*Example XII.—Methyl ((1-(Dimethoxyphosphinyloxy) Vinyl)Thio)Acetate*

27 grams of trimethyl phosphite was added over a 15-minute period to 33 grams of methyl (chloroacetylthio)acetate at 75–85° C. The mixture was heated for 45 minutes at 100–105° C., stripped lightly to remove methylchloride, then heated for 1 hour at 100–110° C. 4 grams of trimethyl phosphite then were added and the mixture was heated at 105–115° C. for 1 hour. The mixture then was Claisen-distilled to a kettle temperature of 135° C. at 0.02 millimeter mercury pressure, and the bottoms were distilled in a molecular still to give 35 grams of methyl ((1-(dimethoxyphosphinyloxy)vinyl)thio)acetate boiling at 100–102° C. at 0.001 milliliter mercury pressure, density 1.3 gram/cubic centimeter, index of refraction: $n_D^{25}$—1.4749.

*Analysis.*—Calculated (percent by weight): P—12.1; S—12.5. Found (percent by weight): P—11.3; S—12.6.

*Example XIII*

By essentially the same procedure set out in Example II, dimethyl 1-(phenylthio)-2-methylvinyl phosphate was prepared from trimethyl phosphite and S-phenyl alpha-chloro, alpha-methylthiol acetate, and diethyl 1-(phenylthio)-2-methylvinyl phosphate was prepared from triethyl phosphite and S-phenyl alpha-chloro-alpha-methylthiolacetate.

Compounds of this invention have been found to exhibit a high level of insecticidal activity with respect to a variety of insects and mites. In particular, certain of them have been found to be outstanding miticides and aphicides, while certain of them have been found to be very toxic to mosquito larvae and to exhibit marked persistance and residual activity toward mosquitoes when applied to solid surfaces, including wood, mud, clay, plaster, and like surfaces.

By the term "insects" is meant not only the members of the class Insecta, but also related to similar organisms belonging to allied classes of arthropods, and including mites, ticks, spiders, wood lice, and the like.

The compounds of this invention can be employed for insecticidal purposes by the use of any of the methods which are conventionally employed in that art. For example, the compounds can either be sprayed or otherwise applied in the form of a solution or dispersion, or it can be sorbed on an inert, finely divided solid and applied as a dust. Useful solutions for application by spraying, brushing, dipping, and the like, can be prepared by using as the solvent any of the well known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite, and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as in insecticide, a compound of this invention can be employed either as the sole toxic ingredient of the insecticidal composition or can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead, and/or fluorine.

The following examples demonstrate the insecticidal properties of typical compounds of this invention.

*Example XIII*

Solutions of typical compounds of the invention were made up employing either a neutral petroleum distillate boiling within the kerosene range or acetone as solvent. The solutions were tested for toxicity against the two-spotted spider mite, *Tetranychus telarius*, and the pea aphid, *Macrosiphum pisi*, by spraying groups of plants infested with these insects under controlled conditions which varies from one test to the other only with respect to the test material and its concentration. These toxicities were compared to the toxicities of parathion, an insecticide widely used for control of these insects. In each set of tests the conditions were directly comparable, i.e., the same test insect, same species of plant, environment, etc., were used and the concentration of active material in each case was the same. The toxicities are expressed in terms of the relationship between the amount of parathion required to produce 50% mortality of the test insects and the amount of test material required to produce the same mortality. Assigning parathion an arbitrary rating of 100%, the toxicity of the test materials is expressed in terms of the toxicity index which compares the activity on a percentage basis with that of the parathion. That is to say, a test compound having a toxicity index of 50 would be half as active as parathion, while one having a toxicity index of 200 would be twice as active as parathion.

The results obtained in these tests is set out in Table I.

TABLE I

| Test Compound | Toxicity Index | |
|---|---|---|
| | 2-spotted mite | pea aphid |
| Dimethyl 1-(phenylthio)vinyl phosphate | 2,700 | 160 |
| Diethyl 1-(phenylthio)vinyl phosphate | 1,700 | 250 |
| Dimethyl 1-(p-chlorophenylthio)vinyl phosphate | 950 | 100 |
| Diethyl 1-(p-chlorophenylthio)vinyl phosphate | 860 | 70 |
| Dimethyl 1-(trichlorophenylthio)vinyl phosphate | 350 | 7 |
| Diethyl 1-(trichlorophenylthio)vinyl phosphate | 500 | 9 |
| Dimethyl 1-(p-tolylphenylthio)vinyl phosphate | 570 | 40 |
| Dimethyl 1-(p-nitrophenylthio)vinyl phosphate | 460 | 170 |
| Dimethyl 1-(2-naphthylthio)vinyl phosphate | 110 | 10 |
| Dimethyl 1-(benzylthio)vinyl phosphate | 540 | 140 |
| Diethyl 1-(benzylthio)vinyl phosphate | 620 | 200 |

*Example XIV*

The toxicity of several of the compounds of the invention toward the common housefly, *Musca domestica*, was determined, the method used being that described by Y. P. Sun, 43 Journal of Economic Entomology 45 et seq. (1950). Table II shows the concentration of test material in the sprayed solution required to cause approximately 50% mortality of the test insect—this concentration is denoted the $LC_{50}$ concentraion. The $LC_{50}$ concentration is expressed in grams of test compound per 100 milliliters of solvent.

TABLE II

| Test Compound | $LC_{50}$ |
|---|---|
| Dimethyl 1-(phenylthio)vinyl phosphate | 0.0135 |
| Dimethyl 1-(p-chlorophenylthio)vinyl phosphate | 0.013 |
| Dimethyl 1-(p-nitrophenylthio)vinyl phosphate | 0.006 |
| Dimethyl 1-(methylthio)vinyl phosphate | 0.0035 |
| Dimethyl 1-(benzylthio)vinyl phosphate | 0.0355 |
| Diethyl 1-(p-chlorophenylthio)vinyl phosphate | 0.017 |

*Example XV*

Two typical compounds of the invention were tested to determine their toxicity with respect to mosquito (*Anopheles albimanus*) larvae, as follows: Sufficient of a 1% acetone solution of the test compound was dissolved in 100 milliliters of water to provide the desired concentration of test compound. Then third instar *A. albimanus* larvae were introduced into each of two replicates per test compound. The larvae were exposed to the solutions of test compounds for 24 hours, then mortality counts were made. The $LC_{50}$ of the test compounds, expressed as parts per million by weight in water, were determined from several concentrations of the test compound. The following results were obtained.

TABLE III

| Test Compound | $LC_{50}$ |
|---|---|
| Diethyl 1-(phenylthio)vinyl phosphate | 0.0055 |
| Dimethyl 1-(p-chlorophenylthio)vinyl phosphate | 0.0029 |

*Example XVI*

Several typical compounds of the invention were tested to determine their residual toxicity with respect to adult mosquitoes (*Anopheles albimanus*) on a solid surface as follows: A solution of the test compound in acetone was applied by pipette to a Petri dish, and the acetone was allowed to evaporate, the application being effected in such a manner that the test compound was distributed uniformly on the inner surface of the Petri dish. The concentration of the compound in the solution and the amount of solution was controlled to give the desired quantity of the test compound per square inch of the surface of the dish. The dishes then were held at 80° F. and 50% relative humidity. Adult *A. albimanus* mosquitoes were exposed for one hour to the dishes one day after treatment, then another group of the mosquitoes was exposed for one hour to the dishes on the seventh day after the treatment, and then another group of mosquitoes was exposed for one hour to the dishes on the fourteenth day after the treatment. At each exposure, the mosquitoes were used on each of two replicates. The results were expressed as the average 24-hour mortality counts of the paired replicates. The following results were obtained:

TABLE IV

| | Average Percent Mortality for One-hour Exposure at Intervals Indicated— Dosage: 10 milligrams/square foot | | |
|---|---|---|---|
| | 1 day | 7 days | 14 days |
| Dimethyl 1-(phenylthio)vinyl phosphate | 100 | 100 | 50 |
| Diethyl 1-(phenylthio)vinyl phosphate | 100 | 100 | 75 |
| Dimethyl 1-(benzylthio)vinyl phosphate | 100 | 100 | |
| Diethyl 1-(benzylthio)vinyl phosphate | 100 | 100 | 75 |
| Dimethyl 1-(2-naphthylthio)vinyl phosphate | 100 | 100 | 95 |
| Dimethyl 1-(p-chlorophenylthio)vinyl phosphate | 100 | 100 | 100 |
| Dimethyl 1-(p-tolylthio)vinyl phosphate | 100 | 100 | 90 |
| Dimethyl 1-(p-nitrophenylthio)vinyl phosphate | 100 | 100 | 85 |
| Dimethyl 1-(trichlorophenylthio)vinyl phosphate | 100 | 100 | 100 |

It is evident from this data that the compounds of this invention are markedly persistent, and have extended residual toxicity toward mosquitoes.

*Example XVII*

Diethyl 1-(phenylthio)vinyl phosphate also was tested to determine its residual toxicity with respect to mosquitoes when applied to a mud surface. In these tests, a red laterite clay was used. Experiments have shown that it is a clay which has typical properties in "deactivating" insecticides sprayed thereupon. The dry clay was mixed with sufficient water to make a stiff "cement," and then molded into a block. The mud blocks were air dried for at least three days at 80° F. and 40% relative humidity, when their weight had become stabilized. The test material was first formulated as a hand-ground wettable powder, and then as hammer-milled wettable powder, using standard formulas. The powders then were dispersed in water and sprayed on the blocks to uniformly coat the surface with the desired dosage of the test material per square foot of block, in this case the dosage was 200 milligrams of test material per square foot of mud surface. Ten *A. albimanus* adults of mixed sexes were confined to the test surface for 60 minutes, then transferred to holding containers provided with food. Mortality counts were taken 24 hours later. The treated blocks were reused at each successive exposure. The following results were obtained with diethyl 1-(phenylthio)vinyl phosphate.

TABLE V

[Average percent mortality at days indicated]

| Hand-ground formulation | | Hammer-milled formulation | |
|---|---|---|---|
| Days | Mortality | Days | Mortality |
| 1 | 100 | 1 | 100 |
| 3 | 100 | | |
| 7 | 100 | 7 | 100 |
| 14 | 100 | 14 | 100 |
| 21 | 75 | 21 | 100 |
| 28 | 40 | 28 | 30 |

These results show that this typical species of the compounds of the invention has even greater persistence and residual activity on this mud surface than on a solid, essentially non-porous surface, such as glass.

*Example XVIII*

In further appropriate tests, typical compounds of the invention, including dimethyl 1-(p-chlorophenylthio)vinyl phosphate, diethyl 1-(p-chlorophenylthio)vinyl phosphate and dimethyl 1-(p-nitrophenyl)vinyl phosphate, were found to be toxic to the rice weevil (*Sitophilus oryzae*), and typical compounds of this invention, including dimethyl 1-(p-nitrophenylthio)vinyl phosphate, were found to be toxic to the corn earworm (*Heliothis zea* (Boddie)).

Compounds of this invention also are of interest as nematocides, activity of typical species of these compounds for this purpose having been ascertained by testing these species for control of the root knot nematode (*Meloidogyne incognita*, var. *acrita*), water being used as the medium. The lethal dosages of these compounds—that is, the dosages required for 100% control of the nematodes—in parts per million by weight of the water medium were as follows:

| Compound | Lethal Dosage |
|---|---|
| Dimethyl 1-(phenylthio) vinyl phosphate | 100-200 |
| Dimethyl 1-(benzylthio) vinyl phosphate | 100-200 |
| Dimethyl 1-(p-chlorophenylthio) vinyl phosphate | 100-200 |
| Dimethyl 1-(p-tolylthio) vinyl phosphate | 100-200 |
| Dimethyl 1-(p-nitrophenylthio) vinyl phosphate | 200-400 |

In further tests, the toxicity of species of these compounds against nematodes in their soil environment was examined. One-gallon jars were filled with soil heavily infested with the root-knot nematode, *Meloidogyne incognita* (var. *acrita*). To one jar of a pair, the test material was added and thoroughly mixed with the soil in a dosage of 0.6 milliliter; the other jar of each pair was used as a blank. The jars then were stored for one week at 80° F. The soil then was transferred from each of the jars into four 4-inch clay pots and the pots were seeded with tomatoes. After six weeks, the soil was washed from the roots of the plants, and the amount of damage caused by the nematodes was visually ascertained by experienced observers. The test compounds and the control of nematodes by each were as follows:

| Compound | Percent control of nematodes |
|---|---|
| Dimethyl 1-(phenylthio)vinyl phosphate | 70 |
| Diethyl 1-(phenylthio)vinyl phosphate | 60 |
| Diethyl 1-(benzylthio)vinyl phosphate | 80 |

As examples of the nematodes which these esters control, there may be mentioned the cyst-forming nematodes of the genus Heterodera, the root knot nematodes of the genus Meloidogyne, the root-lesion nematodes of the genus Pratylenchus and the citrus nematodes of the genus Tylenchulus, the sting nematodes of the genus Belonolaimus, and the plant-parasitic nematodes of such genera as Ditylenchus, Nacobbus and the like.

These esters are employed for the destruction of nematodes and fungi in soil by the usual methods of the art—that is, the active material is intimately disseminated in the soil to be treated to provide the necessary concentration of the active material in that soil. In the case of the present esters, and judging by the experimental work which has been performed, the necessary concentration of the ester lies within the range of from about 20 to about 1000 parts per million, on a weight basis based on the weight of the air-dry soil, with the usual dosage ranging from about 50 parts per million to about 750 parts per million, on the same basis. While one or more of the esters may be applied neat, in most cases it will probably be most effectively disseminated uniformly in the soil by means of an inert carrier. Liquid compositions containing the ester or esters may be prepared by dissolving or dispersing the ester(s) in a suitable organic diluent, such as acetone, various hydrocarbons which are commonly employed for such purpose, water or the like. If desired, suitable emulsifying and/or dispersing agents can be added. Dissemination of the composition into the soil can be effected in any convenient manner—i.e., by simple mixing of the soil and composition, by injection of the composition into the soil, by drenching the surface of the soil with the composition, with or without subsequent tilling of the soil, by including the active ester(s) in irrigation water, by injection into seed beds, by application into furrows into which seeds will be planted, or the like. If desired, the ester(s) can be made up in the form of solid compositions—dusts, granules or the like—for application to the soil. An excellent summary of current practice in the use and application of chemicals to kill soil-borne nematocides and/or fungi is given in United States Patent No. 2,840,501, issued June 24, 1958. The composition containing the ester or esters can also contain other materials, such as insecticides, hormones, or fertilizers, to form multipurpose compositions.

Compounds of this invention also have been found to be effective molluscicides, low concentrations in water killing aquatic mollusks such as snails living therein. Thus, it has been found that at a concentration of three parts per million by weight of the water, the following species of these compounds were effective against *Helisoma trivolvis* living therein, at an exposure time of 24 hours.

Dimethyl 1-(phenylthio)vinyl phosphate
Dimethyl 1-(benzylthio)vinyl phosphate
Diethyl 1-(benzylthio)vinyl phosphate
Dimethyl 1-(p-tolylthio)vinyl phosphate
Dimethyl 1-(trichlorophenylthio)vinyl phosphate Compounds of the invention are employed as molluscicides by disseminating them in the required concentration in the water in which the undesired mollusks are dwelling. Any suitable means for effecting the dissemination can be used—for example, the compounds can be stirred into the water, injected in a portion of the water wherein the water is in turbulent flow, or like mechanical means can be used. The dissemination can also be effected through the use of a highly hydrophilic surface-active agent, such as the water-soluble non-ionic surface-active agents, water-soluble anionic surface-active agents, particularly the esters of sulfuric acid, and which contain a plurality of ether moieties, and the like.

The nonionic surface-active agents which can be used are described in Schwartz and Perry, "Surface Active Agents" (Interscience, 1949) in chapter 8 thereof, and in Schwartz, Perry and Berch, "Surface Active Agents" (Interscience, 1958), on pages 125–138 and 163–166.

Thus, as pointed out in the first of these references, the suitable surface-active agents are those water-soluble materials which contain ether linkages, ester linkages or amide linkages, or which contain combinations of these linkages, to the solubilizing groups. Best known are the reaction products of hydrophobic hydroxy compounds (phenols, alcohols, including certain glycols) with several moles of a lower alkylene oxide (usually ethylene and/or propylene oxide). The kinds of these materials which are known, and methods for their preparation are described in detail in these references. Of particular importance are the polyethenoxy compounds which are described on pages 125–138 of the second reference. Also important are the alkylene oxide block copolymers described on pages 163–166 of that reference.

The thiovinyl ester-surface-active agent compositions can be introduced into the water to be treated in any convenient manner. Often, particularly where the body of water to be treated is small or is in the form of a small canal, the composition to be used can be introduced by means of a syringe, or hand-pump, or the like. Techniques of introduction which cause the composition to be introduced in the form of small droplets—as by, for example, the use of spray nozzles—are preferred.

At least about one part of the thiovinyl ester per million parts by weight of the water treated generally is required to effect control of aquatic snails within a reasonable time, and ordinarily not more than 1000 parts per million of the ester will be required. A concentration of from about two to about one hundred parts per million of the ester ordinarily will be found satisfactory. At such concentrations, residence times of from a few minutes—say, 5–10 minutes—up to several hours—as much as a day—usually are sufficient, with the shorter times being associated with higher thiovinyl ester concentrations.

The thiovinyl esters are effective killers of mollusks, and particularly water-dwelling snails, including *Taphius glabratus, Helisoma trivolvis, Luminae bulimoides, Marisa cornuarietis, Pomacea lineata, P. glauca,* and *Ocinebra japonica.*

We claim as our invention:

1. As a novel compound, an ester of an acid of pentavalent phosphorus having the formula $$R-(X)_m \diagdown \quad Z \quad S-R'' \quad H$$
$$\qquad\qquad P-O-C=C-R'''$$
$$R'-(Y)_n \diagup$$

wherein R and R' each contains up to 10 carbon atoms and is a member of the group consisting of alkyl, cycloalkyl, aryl, alkaryl and aralkyl hydrocarbon radicals, and such hydrocarbon radicals substituted by from one to a plurality of substituents selected from the group consisting of middle halogen atoms, the nitro radical, the cyano radical and amino radicals having the formula $$-N\diagdown (H)_o \diagup (R^0)_p$$

wherein $R^0$ represents a hydrocarbon radical of the group represented by R, $o$ represents an integer of from zero to two, and $o+p=2$, $m$ and $n$ each is an integer from zero to one, X and Y each is a member of the group consisting of —O—, —S—, —NH— and —N($R^0$)—, R'' contains up to 10 carbon atoms and is a member of the group consisting of aryl, alkaryl and aralkyl hydrocarbon radicals, and such hydrocarbon radicals substituted by from one to a plurality of substituents selected from the group consisting of middle halogen atoms, the nitro radical, the cyano radical and amino radicals having the formula $$-N\diagdown (H)_o \diagup (R^0)_p$$

R''' is a member of the group consisting of the hydrogen atom and radicals represented by R, and Z represents a member of the group consisting of oxygen and sulfur.

2. A method for destroying insects which comprises subjecting the insects to the action of the compound of claim 1.

3. As a novel compound, an ester of an acid of pentavalent phosphorus having the formula $$\left(\text{alkyl-O}\right)_2 \overset{O}{\underset{\parallel}{P}}-O-\overset{\text{phenyl}}{\underset{\mid}{\overset{S}{\underset{\mid}{C}}}}=CH_2$$

wherein "alkyl" represents an alkyl radical of from 1 to 4 carbon atoms.

4. As a novel compound, an ester of an acid of pentavalent phosphorus having the formula $$\left(\text{alkyl-O}\right)_2 \overset{O}{\underset{\parallel}{P}}-O-\overset{R''}{\underset{\mid}{\overset{S}{\underset{\mid}{C}}}}=CH_2$$

wherein "alkyl" represents an alkyl radical of from 1 to 4 carbon atoms and R'' represents a phenyl group substituted by from one to a plurality of middle halogen atoms.

5. A method for destroying insects which comprises subjecting the insects to the action of the compound of claim 4.

6. Dimethyl 1-(phenylthio)vinyl phosphate.

7. A method for destroying insects which comprises subjecting the insects to the action of the compound of claim 6.

8. Diethyl 1-(phenylthio)vinyl phosphate.

9. A method for destroying insects which comprises subjecting the insects to the action of the compound of claim 8.

10. Dimethyl 1-(p-chlorophenylthio)vinyl phosphate.

11. A method for destroying insects which comprises subjecting the insects to the action of the compound of claim 10.

12. Diethyl 1-(benzylthio)vinyl phosphate.

13. A method for destroying insects which comprises subjecting the insects to the action of the compound of claim 12.

14. As a novel compound, an ester of an acid of pentavalent phosphorus having the formula $$\left(\text{alkyl-O}\right)_2 \overset{O}{\underset{\parallel}{P}}-O-\overset{R''}{\underset{\mid}{\overset{S}{\underset{\mid}{C}}}}=CH_2$$

wherein "alkyl" represents an alkyl radical of from 1 to 4 carbon atoms and R'' represents an aralkyl hydrocarbon group of up to 10 carbon atoms in which the alkylene chain bonding the aryl moiety to the indicated sulfur atom contains from 1 to 4 carbon atoms.

15. A method for destroying insects which comprises subjecting the insects to the action of the compound of claim 14.

16. As a novel compound, an ester of an acid of pentavalent phosphorus having the formula $$\left(\text{alkyl-O}\right)_2 \overset{O}{\underset{\parallel}{P}}-O-\overset{\text{benzyl}}{\underset{\mid}{\overset{S}{\underset{\mid}{C}}}}=CH_2$$

wherein "alkyl" represents an alkyl radical of from 1 to 4 carbon atoms.

17. A method for destroying insects which comprises subjecting the insects to the action of the compound of claim 16.

18. As a novel compound, an ester of an acid of pentavalent phosphorus having the formula $$\left(\text{alkyl-O}\right)_2 \overset{O}{\underset{\parallel}{P}}-O-\overset{R''}{\underset{\mid}{\overset{S}{\underset{\mid}{C}}}}=CH_2$$

wherein "alkyl" represents an alkyl radical of from 1 to 4 carbon atoms and R'' represents an aralkyl hydrocarbon group of up to 10 carbon atoms.

19. Dimethyl 1-(trichlorophenylthio)vinyl phosphate.

20. A method for destroying insects which comprises subjecting the insects to the action of the compound of claim 19.

References Cited in the file of this patent

UNITED STATES PATENTS

| | | |
|---|---|---|
| 2,864,740 | Diveley | Dec. 18, 1958 |
| 2,864,741 | Diveley | Dec. 18, 1958 |

OTHER REFERENCES

Nishizawa: "Arg. Biol. Chem.," vol. 25, No. 3, pages 229–234, 1961.